US006528146B2

(12) United States Patent
Okuda et al.

(10) Patent No.: US 6,528,146 B2
(45) Date of Patent: Mar. 4, 2003

(54) RECORDING MEDIUM AND IMAGE FORMATION EMPLOYING THE SAME

(75) Inventors: Teruaki Okuda, Tokyo (JP); Toru Nagata, Tokyo (JP); Kenji Suzuki, Kawasaki (JP); Hiroshi Ochiai, Ebina (JP); Mitsuo Miyasaka, Osaka (JP); Yoshinari Yasui, Ebina (JP); Shuichiro Riku, Osaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,572

(22) Filed: Feb. 11, 2000

(65) Prior Publication Data

US 2003/0021960 A1 Jan. 30, 2003

(30) Foreign Application Priority Data

Feb. 16, 1999 (JP) .......................................... 11-037392

(51) Int. Cl.[7] .............................. B32B 3/00; B41J 2/01

(52) U.S. Cl. ....................... 428/195; 428/207; 428/216; 428/331; 428/327; 428/341; 428/500; 428/537.5; 428/704; 347/101; 347/105; 427/256

(58) Field of Search ................................ 428/195, 207, 428/216, 314, 331, 537.5, 500, 327, 704; 347/101, 105; 427/256

(56) References Cited

U.S. PATENT DOCUMENTS

| | | | | |
|---|---|---|---|---|
| 5,576,088 A | * 11/1996 | Ogawa et al. | .............. | 428/327 |
| 5,804,320 A | * 9/1998 | Tomioka et al. | ......... | 428/478.2 |

FOREIGN PATENT DOCUMENTS

| | | |
|---|---|---|
| JP | 8-230311 | 9/1996 |
| JP | 8-310115 | 11/1996 |
| JP | 9-175010 | 7/1997 |
| JP | 10-120976 | 5/1998 |
| JP | 10-193780 | 7/1998 |

* cited by examiner

*Primary Examiner*—Deborah Jones
*Assistant Examiner*—Ling Xu
(74) *Attorney, Agent, or Firm*—Fitzpatrick, Cella, Harper & Scinto

(57) ABSTRACT

A recording medium has a base member and an ink-receiving layer containing amorphous silica provided on the base member. The ink-receiving layer comprises a lower layer and an upper layer formed successively in lamination on the base member. The lower layer contains an anionic group, and the upper layer contains a cationic group.

12 Claims, 1 Drawing Sheet

RECORDING MEDIUM AND IMAGE FORMATION EMPLOYING THE SAME

BACKGROUND OF THE INVENTION

1. Field of the Invention

The present invention relates to a recording medium having an ink-receiving layer formed on the base member. The present invention relates also to a method of image formation employing the recording medium.

2. Related Background Art

Recording mediums of various constructions are known for image formation by ink-jet recording. The recording mediums are required to have better performance in various respects as the fields of application expand into output of electronic image information by an ink-jet printer from computers and networks and output of image information from digital cameras, digital video devices, scanners, or the like, and as various functions become more advanced.

For example, Japanese Patent Application Laid-Open No. 9-175010 discloses a construction of a recording medium for improving the ink absorption and ink fixation, in which the ink-receiving layer containing silica and a binder resin provided on a supporting member has a two-layer structure, the first ink-receiving layer on the supporting member side containing silica particles of an average particle diameter of 1.0 to 6.0 $\mu$m, and the second ink-receiving layer outside containing silica particles of an average particle diameter of 7.0 to 25.0 $\mu$m; the average particle diameter of the silica particles in the first ink-receiving layer being smaller than that in the second ink-receiving layer. Japanese Patent Application Laid-Open Nos. 10-120976 and 10-193780 respectively disclose an ink-receiving layer, for improving ink-fixation and water-resistance, which has a lamination structure comprising a transparent lower layer composed of a graft polymer resin and a transparent upper layer composed of a copolymer containing a cationic quaternary ammonium base. Japanese Patent Application Laid-Open No. 8-230311 discloses a constitution having an ink-receiving layer containing a cationic surfactant and a cationic polymer. Japanese Patent Application Laid-Open No. 8-310115 discloses an ink-receiving layer constituted of a layer of alumina hydrate agglomerated by an anion.

On the other hand, the ink-jet recording method, if it is capable of giving an image quality comparable to that of silver-salt color photograph or that of multicolor printing, can reduce remarkably the unit cost of image formation. Such techniques are demanded to an increasing extent.

For formation of a multicolor image comparable to that of silver salt photograph or multicolor printing, in a known method, the ink-jet recording is conducted on a recording medium having an ink-receiving layer containing porous white fine particles like silica on a base member and after image formation by ink-jet recording a transparent film layer is formed on the ink-receiving layer to raise the surface gloss or surface smoothness of the image to improve the image quality.

In order to form an image of a high quality, comparable to that of silver salt photograph or multicolor printing, by ink-jet printing and formation of a transparent film layer on the ink-receiving layer to give smoothness and gloss to the printed image surface, a larger amount of ink should be received by the ink-receiving layer at the portion of higher image density or higher gradation. Therefore, the recording medium for such uses should have higher ink absorbency.

The higher ink-absorbency for such purpose can be achieved by various methods such as increase of the layer thickness of the ink-receiving layer, or increase of the porosity of the ink-receiving layer by selecting the properties or amount of addition of the fine porous particles or the composition of the ink-receiving layer.

In the method of formation of a transparent film layer on the ink-receiving layer, the gloss and the smoothness of the surface of the ink-receiving layer itself are not necessary for the gloss and the smoothness of the image, since the necessary gloss and smoothness are given by the transparent film layer. Therefore, this degree of freedom is higher in designing the ink-receiving layer to increase the ink-receiving capacity than that for a recording medium having no transparent film layer. For example, the thickness of the ink-receiving layer may be increased, or the size of porous fine particles used may be larger.

However, it was found by the inventors of the present invention that, when the ink-receiving capacity of the ink-receiving layer is increased by increasing the thickness of the ink receiving layer containing the porous fine particles like silica or by increasing the porosity of the ink receiving layer by selection of the porous fine particles, the coloring matter is liable to diffuse into the interior of the ink-receiving layer upon deposition of the ink onto the ink-receiving layer. This sometimes impairs the color development or the image density. Further, it was found by the inventors of the present invention that, in this type of recording medium, the coloring matter in the ink diffuses or spreads in the ink-receiving layer to cause color spreading or color tone change with lapse of time, which is significant when a transparent film layer is formed on the ink-receiving layer after image formation. The aforementioned diffusion or spreading of the coloring matter does not necessarily cause disadvantages, depending on the quality required for the image, but is a problem to be solved in obtaining a higher quality image.

SUMMARY OF THE INVENTION

An object of the present invention is to provide a recording medium which is coated after image formation with a transparent film layer without impairing the properties of the ink-receiving layer and with improvement of color development and coloring matter fixation.

Another object of the present invention is to provide a method of image formation employing the above recording medium.

The recording medium of the present invention has a base member and an ink-receiving layer containing amorphous silica provided on the base member, wherein the ink-receiving layer comprises a lower layer and an upper layer formed successively in lamination on the base member, the upper layer containing a cationic group, and the lower layer containing an anionic group.

The method of image formation of the present invention comprises forming an image by depositing an ink onto an ink-receiving layer of the recording medium and subsequently forming a transparent film layer on the face of the ink-receiving layer to prepare a printed matter having an image face protected by the transparent film on the ink-receiving layer, wherein the recording medium has the constitution defined above.

With the recording medium and the image forming method of the present invention, the coloring matter in the ink is retained so as not to diffuse or spread in the ink-receiving layer, thus restricting the range of coloring matter fixation to be within the ink-receiving layer surface, thereby improving the color development and color fixation, and causing no color change with lapse of time.

DETAILED DESCRIPTION OF THE PREFERRED EMBODIMENTS

Figure 1:
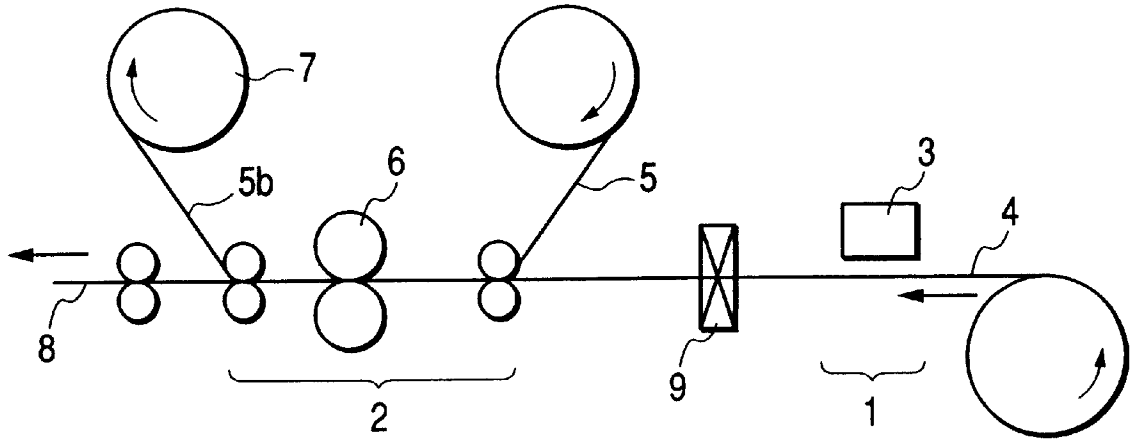
FIG. 1 shows schematically the main portion of an image forming apparatus for employing the present invention.

The recording medium of the present invention has an ink-receiving layer comprising a lower layer having an anionic group and an upper layer having a cationic group formed on the base member.

The base member is made of a material including sheets of plastics such as polyethylene, and polyethylene terephthalate (PET); and sheets of paper such as wood-free paper, coated paper, and laminated paper. The base member is used in a form suitable for the intended supply method, such as a roll or sheet.

The amorphous silica used in formation of the upper layer and the lower layer can be produced by a gelation process. The amorphous silica includes Mizukasil P50, and Mizukasil P78A (trade names, Mizusawa Kagaku Kogyo K. K.), and MOX170 (trade name, Degussa Co.). The amorphous silica has an average particle diameter ranging preferably from 0.1 to 15 μm; more preferably from 0.1 to 8 μm in the upper layer for dye adsorption, and from 3 to 15 μm in the lower layer for ink solvent absorption.

The lower layer and the upper layer can be produced, for example, by applying an amorphous silica-containing coating liquid (and a binder as necessary) onto the surface of a base member, and drying it. The coating may be conducted by roll coating, rod bar coating, spray coating, air knife coating, slot die coating, or a like coating method.

The binder, when it is employed, is blended to the amorphous silica at a blending ratio, for example, ranging from 10 to 100 parts by weight to 100 parts by weight of the amorphous silica.

The binder includes water-soluble polymers such as polyvinyl alcohols, vinyl acetate resins, and acrylic resins; and emulsions of polyurethane. Two or more of the binders may be used in combination, provided that the effects of the present invention are not lessened.

For introducing the anionic group into the lower layer, an anionic group-containing compound may be incorporated together with the layer-forming materials into the layer. Otherwise, the binder may be selected from compounds having an anionic group. The anion includes inorganic anions such as halide ions, nitrate ions, sulfate ions, phosphate ions, hydrogenphosphate ions, dihydrogenphosphate ions, and thiosulfate ions; and organic acid anions such as carboxylic acid ions, and sulfonic acid ions. The anion is preferably supplied in the form of an electrolyte such as a metal salt.

The anionic group-containing compound useful as the binder is exemplified by modified polyvinyl alcohols (modified PVA) having an anionic group. The anionic group includes a carboxyl group, sulfo group, and phosphate group. For ease of production, the carboxyl group and the sulfo group are preferred.

The anionic group-containing compound is incorporated into the lower layer at a ratio ranging preferably from 0.05% to 10% by weight relative to the weight of the silica solid matter.

On the other hand, for introducing the cationic group into the upper layer, the layer may be formed from a cationic group-containing compound and the layer-forming materials. Otherwise, the binder for the layer may be selected from compounds having a cationic group. The compound having a cationic group includes polymers produced from a vinyl monomer having a quaternary ammonium base on its side chain, and copolymers of the monomer with another monomer. The cationic polymer includes cationic polyacylamides, cationic styrene copolymers, polymethyidiallylammonium chloride, polyaminepolyamide epichlorohydrins, polyethylenimine, and polyaminosulfones. Specific example thereof are Neofix RX-100 (trade name, Nikka Kagaku K. K.), PAS (trade name, Nitto Boseki K. K.), and so forth. Two or more of these compounds may be used in combination provided that the effects of the present invention are not lessened thereby.

The cationic group-containing compounds useful as the binder include modified polyvinyl alcohols (modified PVA) having a cationic group on the main chain or the side chain thereof. The cation-modifying substance includes vinyl monomers containing a quaternary ammonium group; and PVA having an o-, m-, or aminostyrene or monoalkyl thereof on the main chain or the side chain.

The cationic group-containing compound is incorporated into the upper layer at a ratio ranging preferably from 1% to 10% by weight based on the weight of the silica solid matter.

An interlayer may be provided between the upper layer and the lower layer for increasing the interlaminar strength, provided that the effects of the present invention, namely the effect of retention of the coloring matters of the ink in the upper layer and the effect of absorption of the ink solvent, are not lessened thereby.

The thicknesses of the upper layer and the lower layer may be selected within the range in which the effects of the present invention can be achieved. For example, the thickness of the upper layer ranges preferably from 5 to 30 μm, and the thickness of the lower layer ranges preferably from 10 to 50 μm.

The ink-receiving layer may contain additives such as a dispersant, a fluorescent dye, a pH adjusting agent, a lubricant, and a surfactant, as necessary, within the range in which the effects of the present invention are not lessened.

The constitution of the member for formation of the transparent film layer on the ink-receiving layer after image formation is not limited in the present invention, provided that it is capable of forming a transparent film layer on the ink-receiving layer after the image formation. For example, the member may have a structure in which a single layer or a multiple layer of a thermoplastic film or a latex layer is formed on a heat-resistant base material.

The heat-resistant base material is not limited, provided that it is capable of retaining its shape stably under the heating and pressing conditions during the formation of the transparent film and is peelable when the transparent film has been formed on the ink-receiving layer. The heat-resistant base material includes films and sheets of polyethylene terephthalate resins (PET), polyethylene naphthalate resins (PEN), polyphenylene sulfide resins (PPS), and polyether sulfone resins (PES). The thickness thereof is selected suitably for the lamination treatment in the range, for example, from 25 to 50 μm.

In the case where a latex layer is employed, for example, the member is constituted such that thermoplastic particles are fixed in a layer on a base material so as not to come off from the base material, and the layered thermoplastic particles are capable of forming a film by heating. The material for formation of the latex layer includes latexes of vinyl chloride/vinyl acetate type polymers, styrene type polymers, and acrylic type polymers.

The latex layer may be formed by application of a coating liquid containing a latex by roll coating, rod bar coating, spray coating, air knife coating, slot die coating, or a like coating method, and drying it. The formed latex layer has a thickness suitable for obtaining the desired final image quality after formation of the transparent film layer on the ink-receiving layer of the recording medium, the thickness ranging, for example, from 2 to 30 $\mu$m. The latex layer of multiple layer constitution may also be formed in a total thickness of the latex layers to be the same as in the above single layer constitution to form the transparent film layer of a thickness for obtaining the desired image quality as a whole. For example, the final total thickness of the transparent film on the ink-receiving layer ranges from 2 to 30 $\mu$m, preferably from 5 to 15 $\mu$m to obtain higher image quality.

The recording medium having the aforementioned constitution and the transparent film-forming member can be employed for image formation. The image formation can be conducted by various methods. An ink-Jet recording method is suitable therefor, including electrostatic suction systems, piezoelectric element systems, and heat-generating element systems, but is not limited thereto.

The ink for the ink-jet recording may be any ink suitable therefor, including an ink containing a coloring matter such as a dye or a pigment in an aqueous medium. In color printing, a full color image can be formed by subtractive color mixing in a conventional manner by employing cyan, magenta, and yellow, and if necessary, black additionally.

By use of a member having a transparent film-forming material layer formed on a base material, the transparent film layer is formed on the ink-receiving layer, for example, in a manner shown below. An image is formed by depositing an ink on the ink-receiving layer of the recording medium corresponding to image information by an ink-jet recording method. Then, the face of the ink-receiving layer of the recording medium is overlaid with the face of the transparent film-forming material layer on a base material. The overlaid matter is pressed with heating by passage between a pair of opposing rollers, or a like method to contact-bond the transparent film-forming material layer onto the ink-receiving layer and to form a transparent film. Finally, the base material of the transparent film-forming member is peeled from the transparent film bonded onto the ink-receiving layer to obtain a print having an image formed in the ink-receiving layer protected by the transparent film.

Figure 2A:
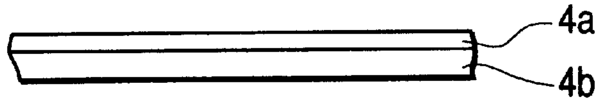
FIGS. 2A, 2B, and 2C are drawings for explaining a process for formation of a transparent film layer on an ink-receiving layer of a recording medium.
Figure 2B:
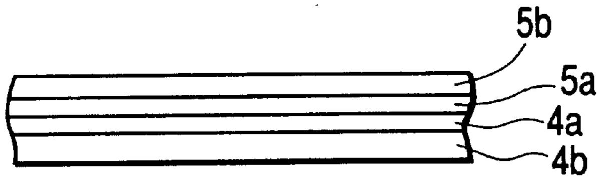
Figure 2C:
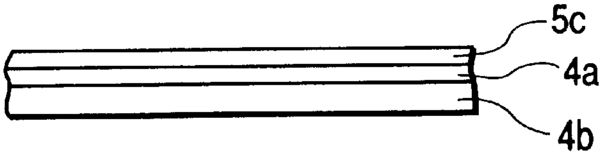

FIG. 1 shows an example of the apparatus for formation of such a transparent film layer. This apparatus comprises an ink-jet recording section 1 for conducting ink-jet recording on a face on the ink-receiving layer side of a recording medium in a wound-up state, and lamination treatment section 2 for forming a transparent film layer. The ink-jet recording section 1 has an ink-jet recording head 3. The ink-jet recording head applies ink onto the ink-receiving layer 4*a* on the base member 4*b* of the recording medium 4 shown in FIG. 2A in accordance with image information to form an image. After the image formation, the recording medium carrying the image is cut by a cutter 9 into a sheet in a prescribed size. Then a transparent film layer-forming member 5 is placed in superposition on the ink-receiving layer 4*a* of the recording medium with the transparent film formation material layer 5*a* inside. The laminated film is allowed to pass through a pair of rollers 6 to be pressed, if necessary with heating. By this treatment, the transparent film-forming material layer 5*a* is press-bonded to the ink-receiving layer 4*a*, and is simultaneously converted into a transparent film. After passage through the roller pair, the base member 5*b* of the member 5 is peeled from the transparent film layer formed on the ink-receiving layer 4*a* by pulling the base material 5*b* of the member 5 by means of a winding apparatus 7. Thus a print is obtained which has the transparent film layer 5*c* on the ink-receiving layer 4*a* carrying an image as shown in FIG. 2C.

The pressing force and the heating temperature of the roller pair is set depending on the kind of the transparent film layer-forming material.

The ink-receiving layer of the recording medium of the present invention has excellent ink absorbency. Therefore, by selecting the constitution, the maximum amount of the ink deposition can be set at 12.24 ml or more per square inch.

The present invention is described below in more detail by reference to Examples.

EXAMPLE 1

One part by weight of silica (Mizukasil P-50, Mizusawa Kagaku Kogyo K. K.) and 0.6 part by weight of a binder resin emulsion (NS120-XK, Takamatsu Yushi K. K.) were combined, and the combined matter was put into deionized water and dispersed therein to obtain a coating liquid containing the solid matter at a solid content of 20% by weight. To this coating solution, an aqueous 10% sodium nitrate solution was added as the anion in a solid amount of 0.5% by weight based on the weight of the silica solid matter to obtain a first coating liquid.

Separately, one part by weight of silica (Mizukasil P-50, Mizusawa Kagaku Kogyo K. K.) and 0.6 part by weight of a binder resin emulsion (NS120-XK, Takamatsu Yushi K. K.) were combined, and the combined matter was put into deionized water and dispersed therein to obtain a coating liquid containing the solid matter at a solid content of 20% by weight. To this coating solution, an aqueous 10% solution of a cationic polymer PAS-H-10L (Nitto Boseki Co.) was added in a solid amount of 3.0% by weight based on the weight of the silica solid matter to obtain a second coating liquid.

The first coating solution was applied in a dry thickness of 30 $\mu$m on a wood-free paper sheet of 186 g/m$^2$ as the base member by a slot die coater, and was dried to prepare the first layer (lower layer). Further on the first layer, the second coating liquid was applied in a dry thickness of 20 $\mu$m by a slot die coater in a similar manner to obtain the second layer (upper layer), thereby completing a recording medium.

EXAMPLE 2

A recording medium was prepared in the same manner as in Example 1 except that the conditions were as shown in Table 1

COMPARATIVE EXAMPLES 1 and 2

A third coating liquid was prepared in the same manner as preparation of the first coating liquid except that the anion was not added. This third coating liquid was applied in a dry thickness of 30 $\mu$m on a wood-free paper sheet of 186 g/m$^2$ as the base member by a slot die coater, and was dried to prepare the first layer (lower layer). Further on the first layer, the second coating liquid prepared in Example 1 was applied in a dry thickness of 20 μm by a slot die coater in a similar manner to obtain the second layer (upper layer) to complete a recording medium (Comparative Example 1).

Separately, a recording medium was produced in the same manner as above except that the conditions were changed as shown in Table 1 (Comparative Example 2).

The obtained recording mediums were evaluated for the evaluation items below. The evaluation results are shown in Table 1 and Table 2.

(1) Image Density (Ink Fixing Property):

Onto recording mediums, droplets of ink of black, cyan, magenta, or yellow (pure color respectively) were deposited by means of a Hyper-photo printer HS-100 (manufactured by Canon Inc.) respectively in an amount of 720000 droplets of a single ink droplet volume of 8.5 pl in a one-inch square area. (The quantity of the ink of 720000 droplets is taken as 100%.) The image densities of the respective colors were measured by a densitometer (TR924, McBeth Co.).

(2) Initial Image Feathering (Ink Absorbency):

With the same printer and under the same conditions as in the evaluation of the image density (above Item (1)), printing was conducted with an ink of one of four colors of blue (cyan 100%+magenta 100%), green (cyan 100%+yellow 100%), red (magenta 100%+yellow 100%), and process black (black 100%+cyan 50%+yellow 50%+magenta 50%). The images immediately after the printing were evaluated visually for image feathering. A recording medium which caused no image feathering even with the process black ink was evaluated as "good"; one which caused no image feathering with blue, green, and yellow inks, and caused slight image feathering with process black, but causing no practical problem was evaluated as "fair", and one which caused image feathering with blue, green, or yellow ink was evaluated as "poor".

(3) Later Image Feathering With Lapse of Time:

The recording medium which was evaluated to be fair or good was kept at 30° C. and 80% relative humidity to accelerate the image feathering for one week. The image feathering was evaluated visually with the same standards in the above initial image feathering (above Item (2)).

The ink-receiving medium of the present invention comprises an upper layer containing a cationic group and a lower layer containing an anionic group. Thereby, the color developing property and coloring matter-fixing ability of the upper layer is improved further with retention of required properties, such as ink absorbency, of the ink-receiving layer of a recording medium of such a type that the recording medium after image formation is covered with a transparent film layer.

TABLE 1

| | Layer thickness (μm) | | Additive | | | | | | Image feathering | |
|---|---|---|---|---|---|---|---|---|---|---|
| | First layer (lower) | Second layer (upper) | Anion in first layer | Cation in second layer | Image density: Black | Cyan | Magenta | Yellow | Just after printing | Later |
| **Examples** | | | | | | | | | | |
| 1 | 40 | 20 | Sodium nitrate | PAS-H-10L | 2.1 | 2.2 | 2 | 1.9 | Good | Good |
| 2 | 40 | 10 | Sodium nitrate | PAS-H-10L | 1.6 | 1.7 | 1.6 | 1.6 | Fair | Fair |
| **Comparative Examples** | | | | | | | | | | |
| 1 | 40 | 20 | None | PAS-H-10L | 1.8 | 1.9 | 1.8 | 1.8 | Good | Poor |
| 2 | 40 | 20 | None | None | 1.8 | 1.9 | 1.8 | 1.8 | Fair | Poor |

TABLE 2

| Affecting construction: | First layer (Lower layer) | Second layer (Upper layer) | Anion in first layer | Cation in second layer |
|---|---|---|---|---|
| Factors affected | Initial image feathering | Image density | Image density | |
| | | Initial image feathering | | Initial image feathering |
| | | | Later image feathering | Later image feathering |

What is claimed is:

1. A recording medium having a base member and an ink-receiving layer provided on the base member, wherein the ink-receiving layer comprises a lower layer and an upper layer formed successively in lamination on the base member, the lower layer containing amorphous silica and a compound having an anionic group, and the upper layer containing amorphous silica and a compound having a cationic group, wherein the amorphous silica contained in the upper layer has an average particle diameter ranging from 0.1 to 8 μm and the amorphous silica contained in the lower layer has an average particle diameter ranging from 3 to 15 μm.

2. The recording medium according to claim 1, wherein the upper and lower layers further contain a binder.

3. The recording medium according to claim 1, wherein the upper layer has a thickness ranging from 5 to 30 μm, and the lower layer has a thickness ranging from 10 to 50 μm.

4. The recording medium according to claim 3, wherein the upper and lower layers further contain a binder.

5. The recording medium according to claim 4, wherein the amorphous silica and the binder are contained at a weight ratio ranging from 1:1 to 10:1.

6. The recording medium according to claim 1, wherein the compound having an anionic group is a compound having at least an anionic group selected from the group consisting of halide ions, nitrate ions, sulfate ions, phosphate ions, hydrogenphosphate ions, dihydrogenphosphate ions, thiosulfate ions, carboxylic acid ions and sulfonic acid ions.

7. The recording medium according to claim 1, wherein the compound having an anionic group is a polyvinyl alcohol having at least an anionic group selected from the group consisting of a carboxyl group, a sulfo group and a phosphate group.

8. A method of image formation, comprising forming an image by applying an ink onto an ink receiving layer of the recording medium and subsequently forming a transparent film layer on the face of the ink-receiving layer to prepare a printed matter having an image face protected by the transparent film on the ink-receiving layer, wherein the recording medium is one set forth in any of claims 1 to 5.

9. The method of image formation according to claim 8, wherein the ink is deposited by an ink-jet recording method.

10. The method of image formation according to claim 8, wherein the transparent film is formed on the ink-receiving layer through a process of heat-bonding a transparent film-forming material layer held by a heat-resistant base member onto the ink-receiving layer to form a transparent film layer, and peeling the heat-resistant base material from the ink-receiving layer.

11. The method of image formation according to claim 9, wherein the maximum amount of the ink deposition is 12.24 ml or more per square inch.

12. A print obtained by the image-forming method set forth in claim 8.

* * * * *

UNITED STATES PATENT AND TRADEMARK OFFICE
CERTIFICATE OF CORRECTION

PATENT NO. : 6,528,146 B2
DATED : March 4, 2003
INVENTOR(S) : Teruaki Okuda et al.

It is certified that error appears in the above-identified patent and that said Letters Patent is hereby corrected as shown below:

Title page,
Item [*] Notice, insert:
-- This patent issued on a continued prosecution application filed under 37 CFR 1.53(d), and is subject to the twenty year patent term provisions of 35 U.S.C. 154(a)(2). --

Column 5,
Line 24, "-Jet" should read -- -jet --.

Signed and Sealed this

Seventeenth Day of February, 2004

JON W. DUDAS
*Acting Director of the United States Patent and Trademark Office*